Patented Feb. 5, 1935

1,989,925

UNITED STATES PATENT OFFICE 1,989,925

PROCESS OF TREATING GALVANIZED SHEETS

George R. Hoover and William E. Marshall, Middletown, Ohio, assignors to The American Rolling Mill Company, Middletown, Ohio, a corporation of Ohio No Drawing. Continuation of application Serial No. 477,469, August 23, 1930. This application August 24, 1931, Serial No. 559,136

12 Claims. (Cl. 148—6)

This is a continuation of our application Ser. No. 477,469, filed Aug. 23, 1930.

It is well known that new galvanized iron or steel sheets do not readily take and retain coatings of paint which is due to the fact that a fresh coating of zinc or some alloy thereof is extremely smooth. If these sheets are used on the outside of buildings, for instance, roofs or sidings, it has been the practice to expose them to weathering conditions for a period of time, say a quarter of a year, until the surface of the coating has become oxidized to a certain extent, the oxide coating forming a better tooth for paint coatings. It is self-evident that it would be a decided advantage to apply coats of paint as soon as the construction job is finished. In some cases shop painting may be preferable to field painting, and implies painting the sheets while they are fresh. In order to make freshly galvanized sheets take and retain coats of paint, it has been proposed to treat the freshly galvanized sheets with acid, such as acetic acid. However, these attempts have not met with complete success and in addition are relatively expensive.

It is an object of our invention to produce galvanized sheets which will satisfactorily accept and retain coatings of paints, oils, asphalts, coal tar and similar organic substances which may be used as protective coatings. It is another object of our invention to produce galvanized sheets which are suitable for employment in uses where they are to receive coatings of paint or the like, as in the erecting of bill boards.

These and the more specific objects of our invention which will be set forth hereinafter or will be apparent to one skilled in the art upon reading these specifications, we accomplish by that certain process of which we shall now describe an exemplary embodiment.

Our process consists broadly in immersing galvanized sheets after the galvanizing treatment in a tank containing a solution of lime (calcium hydroxide). This solution may be milky due to an excess of suspended lime. If desired, we may do away with the suspended material by filtering or by using a solution less than saturated. For most purposes the suspended material is not objectionable. Our general practice is to use a solution and suspension containing 5% by weight of calcium hydroxide. However, the proportions may be varied over wide limits with good results. We have used solutions containing as little as 0.05% of calcium hydroxide up to saturated solutions with sufficient suspended matter to give them a consistency about as thick as mortar. We may use other alkalis in the bath such as sodium and potassium hydroxides if we so desire; but we have not ordinarily found this necessary. The use of the stronger alkalis stresses an etching of the sheet while the use of calcium hydroxide produces a coated sheet. The latter is preferable. The addition of stronger alkalis of course, increases the expense of treatment. We have found that the action of lime or other alkaline earth hydroxides alone is satisfactory.

Also, we have found the addition of certain ionizable salts to be of value, particularly chlorides such as sodium chloride and calcium chlorides. The chloride ion tends to speed up the process, decreasing the time of treatment. It is generally added in amounts of 1 to 2 per cent, but larger amounts can be used if desired. The use of chlorides is not preferred by us, since any residue of chlorides on the surface of the sheet after treatment may tend to accelerate corrosion; but the expedient may be employed with good results particularly when time is a factor, or when the sheets are to be painted within a very short time. Other salts such as phosphates, sulphates, fluorides, and the like, may be added to the calcium hydroxide solution.

We immerse our sheets using suitable apparatus for the purpose (pickling machine of commercial types are suitable) in our lime bath for a period varying usually between 5 and 45 minutes, in accordance with the service expected of the sheet, in accordance with the concentration of the solution and suspension in the tank or other factors. The average time of a satisfactory treatment is about 30 minutes. The time of immersion is not critical and sheets may be immersed any length of time without detriment. Neither is the temperature critical. We have found it possible to operate the process at any temperature between the freezing point and the boiling point of the solution being used.

Our process also forms a coating upon the sheets as hereinabove indicated. We attach great importance to this coating action. The coating itself, we believe, comprises a hydrated mixture of zinc and calcium oxides. Although thin, it has very absorbent properties and a good bond to the sheet; and consequently we have found that our process increases the ability of galvanized sheets to hold paints, bitumens and other organic coatings and that it gives a surface upon galvanized sheets which is superior in its ability to hold organic protective coatings, to sheets treated for a like reason with acids, salts or acid forming salts.

In some instances agitation with air may be employed advantageously, and may be effective in making the action of the solution on the sheets more uniform. It serves to keep undissolved matters in suspension, but may shorten the life of the solution.

In addition to the process described above the sheets described may be produced in the same solution with the use of the electric current, the sheets being treated as anodes.

We have described our invention in connection with the treatment of "galvanized sheets". We include within this expression not only sheets coated with or having a surface of zinc alone, but also sheets or articles coated with or having a surface of alloys of which zinc is the major alloying ingredient.

Having thus described our invention, what we claim as new and desire to secure by Letters Patent, is:—

1. A process of treating galvanized sheets to prepare them for the reception of organic coatings which comprises immersing said sheets in a solution of calcium hydroxide.

2. A process of treating galvanized sheets to prepare them for the reception of organic coatings which comprises immersing said sheets in a solution of calcium hydroxide containing calcium hydroxide in suspension.

3. A process of treating galvanized sheets to prepare them for the reception of organic coatings which comprises immersing said sheets in a solution and suspension of calcium hydroxide containing other alkali.

4. A process of treating galvanized sheets for the reception of organic coatings which comprises treating said sheets with a solution and suspension of calcium hydroxide containing another ionizable salt.

5. A process of treating galvanized sheets for the reception or organic coatings which comprises treating said sheets with a solution and suspension of calcium hydroxide containing a chloride salt.

6. A process of preparing galvanized sheets for the reception of organic coatings which comprises treating said sheets with a solution of an alkaline earth hydroxide.

7. A process of preparing galvanized sheets for the reception of organic coatings which comprises treating said sheets with a cold solution of calcium hydroxide together with another alkali.

8. A process for preparing galvanized sheets for the reception of paint coatings which comprises coating said sheets by treatment with a suspension of calcium hydroxide.

9. A process of preparing galvanized sheets for the reception of organic coatings which comprises treating said sheets with a solution of an alkaline earth hydroxide together with another alkali.

10. A process of preparing sheets coated with zinc alloys for the reception of organic coatings, which comprises coating said sheets with a thin, adherent coating of zinc and calcium oxides by treatment with calcium hydroxide.

11. A treated galvanized sheet for the purpose of holding paint and other organic coatings characterized by a surface which consists of a thin adherent coating of a hydrated mixture of zinc and calcium oxides.

12. An article having a cleaned zinc-bearing surface coated with a thin, adherent film of oxides of zinc and of an alkaline earth.

GEORGE R. HOOVER.
WILLIAM E. MARSHALL.